(12) United States Patent
Dickey

(10) Patent No.: US 11,589,554 B2
(45) Date of Patent: Feb. 28, 2023

(54) COMFORTING DOG BED

(71) Applicant: Ronnie Dickey, Water Valley, MS (US)

(72) Inventor: Ronnie Dickey, Water Valley, MS (US)

( * ) Notice: Subject to any disclaimer, the term of this patent is extended or adjusted under 35 U.S.C. 154(b) by 795 days.

(21) Appl. No.: 16/149,580

(22) Filed: Oct. 2, 2018

(65) Prior Publication Data

US 2019/0166794 A1 Jun. 6, 2019

Related U.S. Application Data

(60) Provisional application No. 62/540,340, filed on Aug. 2, 2017.

(51) Int. Cl.
*A01K 1/035* (2006.01)
*A47G 9/02* (2006.01)

(52) U.S. Cl.
CPC ............ *A01K 1/0353* (2013.01); *A01K 1/035* (2013.01); *A47G 9/02* (2013.01); *A47G 9/0223* (2013.01)

(58) Field of Classification Search
CPC ...... A01K 1/0245; A01K 1/0353; A01K 1/03; A01K 1/035; A01K 1/0236; A01K 1/0254; A01K 1/0035; A01K 1/015; A01K 1/0157; A01K 1/0218; A01K 1/0272; A47G 9/02; A47G 9/0223
See application file for complete search history.

(56) References Cited

U.S. PATENT DOCUMENTS

| 2,854,948 | A | | 10/1958 | Drayson | |
|---|---|---|---|---|---|
| 5,357,901 | A | * | 10/1994 | Batts | A01K 1/0353 119/28.5 |
| 5,749,314 | A | | 5/1998 | Pelham | |
| 7,530,326 | B2 | | 5/2009 | Dunn et al. | |
| 7,559,290 | B2 | * | 7/2009 | West | A01K 1/0353 119/28.5 |
| 8,342,126 | B2 | * | 1/2013 | Simon | A01K 1/035 119/28.5 |
| 2005/0087142 | A1 | * | 4/2005 | Dalal | A01K 1/0353 119/28.5 |
| 2013/0167776 | A1 | | 7/2013 | Schiel et al. | |
| 2016/0021846 | A1 | | 1/2016 | Bigott | |

* cited by examiner

*Primary Examiner* — Christopher D Hutchens
*Assistant Examiner* — Steven J Shur
(74) *Attorney, Agent, or Firm* — Michael C. Balaguy

(57) ABSTRACT

A pet bed including a cushioned-base defined by a body-section and a head-section; a blanket removably fastened to the cushioned-base; and fastener for removably fastening the blanket to the cushioned-base. The cushioned-base includes molded sections to provide support and comfort to the bed. In particular, the head-section includes a molded section which defines a pillow. The pet bed is useful for providing a pet, particularly a dog, with a comforting location to rest.

18 Claims, 5 Drawing Sheets

COMFORTING DOG BED

CROSS REFERENCE TO RELATED APPLICATION

The present application is related to and claims priority to U.S. Provisional Patent Application No. 62/540,340 filed Aug. 2, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of beds and more specifically relates to a bed for a dog.

2. DESCRIPTION OF RELATED ART

Many people have dogs. Dogs love to be cozy when resting or sleeping and they especially love being huddled under blankets. Sometimes without a blanket, a dog can feel insecure and fearful, which may lead to whining and barking. Loose blankets may be a hazard for a dog and pet owners spend a good deal of time making sure their dog is comfortable by continuously covering the animal with a blanket, only for it to fall off when the dog moves. A suitable solution is desired.

U.S. Pub. No. 2016/0021846 to Jeffry John Bigott relates to a pet bed with built-in attached blanket cover. The described pet bed with built-in attached blanket cover includes a soft covered foam wall, with an attached blanket cover to keep the animal warm and secure. Made of only a few separate components including the foam inner wall, detachable zipped wall cover with attached blanket and floor and removable cushioned pillow. The blanket cover is attached to approximately 75% of the wall covering's top periphery, regardless if it is of a square or rectangular shape, or if its circumference is of a rounded or oval shape. This removable wall cover with attached blanket also has an attached floor that completes the wall enclosure's bottom through a periphery zipper, securing the complete wall covering to the internal foam padded wall. Collectively, the detachable zipped wall cover with attached blanket and floor, is tucked, and then zipped, over the foam wall, creating a completely supported pet bed structure. A removable cushioned pillow is stuffed and inserted between upper topside attached blanket and lower bottom side floor to act as a soft resting place and floor cushion. The front wall cut-out is the open and unattached portion of the blanket cover that creates an entrance for easy pet access and escape.

BRIEF SUMMARY OF THE INVENTION

In view of the foregoing disadvantages inherent in the known beds art, the present disclosure provides a novel dog bed. The general purpose of the present disclosure, which will be described subsequently in greater detail, is to provide a dog bed with a pillow and attached blanket that offers a comforting location for pets to rest.

A pet bed is disclosed herein. The pet bed includes a cushioned-base defined by a body-section and a head-section. The body-section may include a first molded-section and the head-section may include a second molded-section; the second molded-section may define a pillow. A blanket may be removably fastened to the cushioned-base and may be constructed from a washable fabric. Further, a fastener may be provided for removably fastening the blanket to the cushioned-base. The fastener may be able to selectively fully fasten the blanket to the cushioned-base, partially fasten the blanket to the cushioned-base, and fully unfasten the blanket from the cushioned-base.

A method of using pet bed is also disclosed herein. The method of using pet bed may comprise the steps of: providing the pet bed as above; covering the cushioned-base with a cover; fastening the blanket to the cushioned-base via the fastener; and using the pet bed.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a comforting dog bed, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to beds and more particularly to a dog bed as used to improve the bed for a dog.

Generally disclosed is a dog bed including a blanket that may swaddle a dog to make them feel secure. The dog bed may allow the dog to burrow underneath the blanket with ease, eliminating the need for pet owners to cover their pet. The dog bed may decrease anxiety and fear by providing a safe space for pets to rest. The dog bed may include at least one pillow and a removable blanket that is attached to the bed. The bed may be approximately 28"×42".

The blanket may be attached to the bed with a zipper to allow for easy removal for cleaning. Further, the bed may be comprised of foam with a molded foam pillow and a molded body. The pillow portion and body may be covered by a soft fabric covering which may be removable, and the blanket may be made from a plush materiaL The design of the bed may allow the dog to crawl under the blanket on their own. Further, the dog bed may be able to be personalized with indicia such as the dog's name. The exact specifications may vary.

Referring now more specifically to the drawings by numerals of reference, there is shown in FIGS. 1-5, various views of a pet bed 100.

Figure 1:
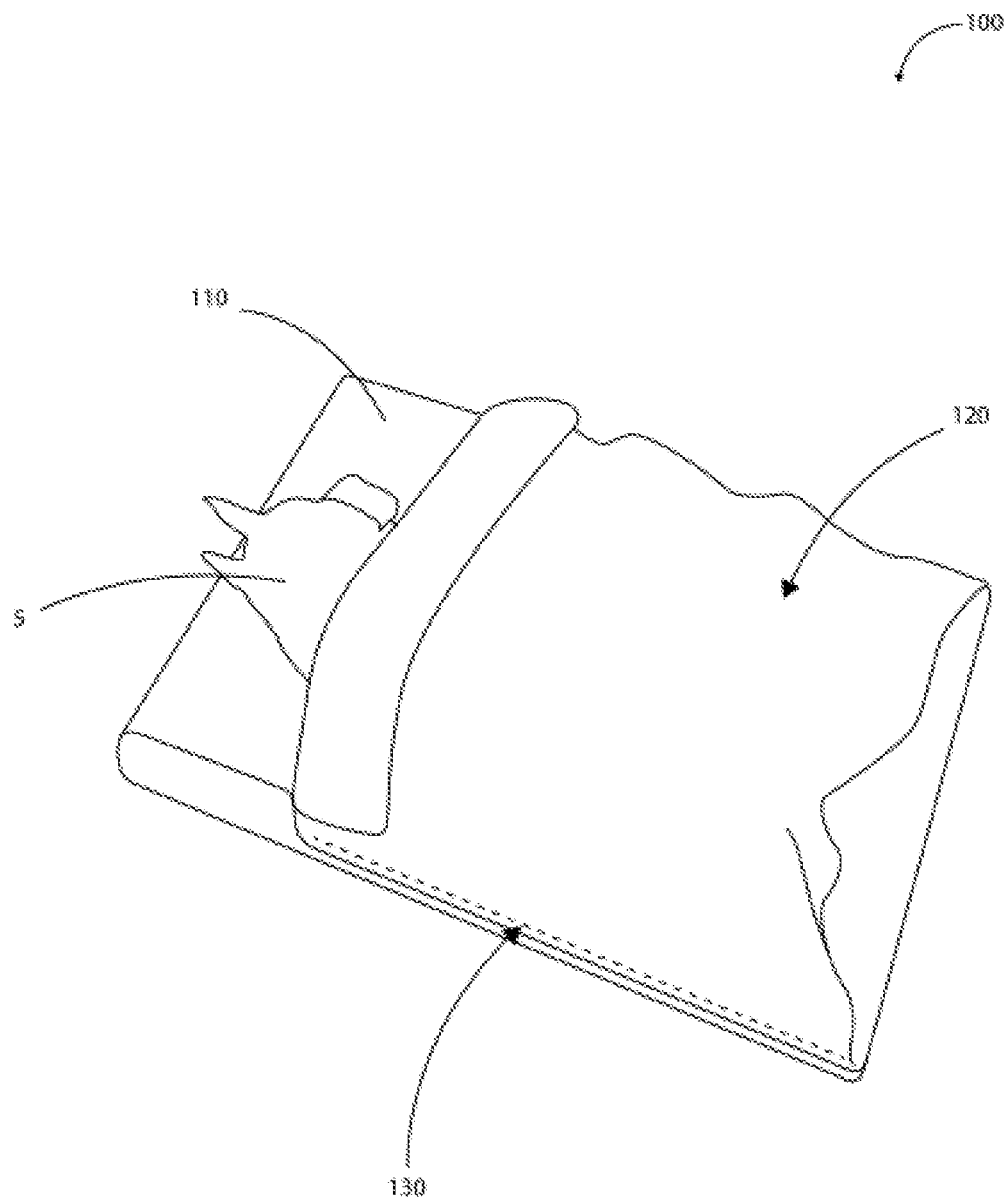
FIG. 1 is a side-top perspective view of the pet bed during an 'in-use' condition, according to an embodiment of the disclosure.

FIG. 1 shows a pet bed 100 during an 'in-use' condition 150, according to an embodiment of the present disclosure. As illustrated, the pet bed 100 may include a cushioned-base 110, a blanket 120, and a fastener 130. As shown, the pet bed 100 may be for a pet 5 and particularly suitable for a dog. Further, the pet bed 100 may be able to be personalized with indicia, such as the dog's name, initials, nickname, special date, etc.

Figure 2A:
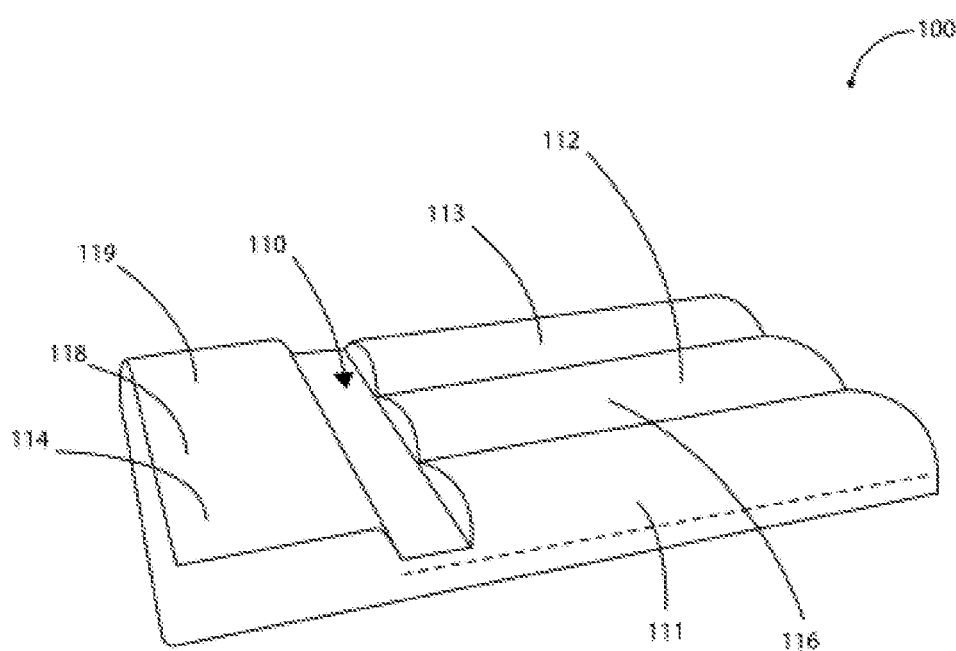
FIG. 2A is a side perspective view of the pet bed of FIG. 1, according to an embodiment of the present disclosure.
Figure 2B:
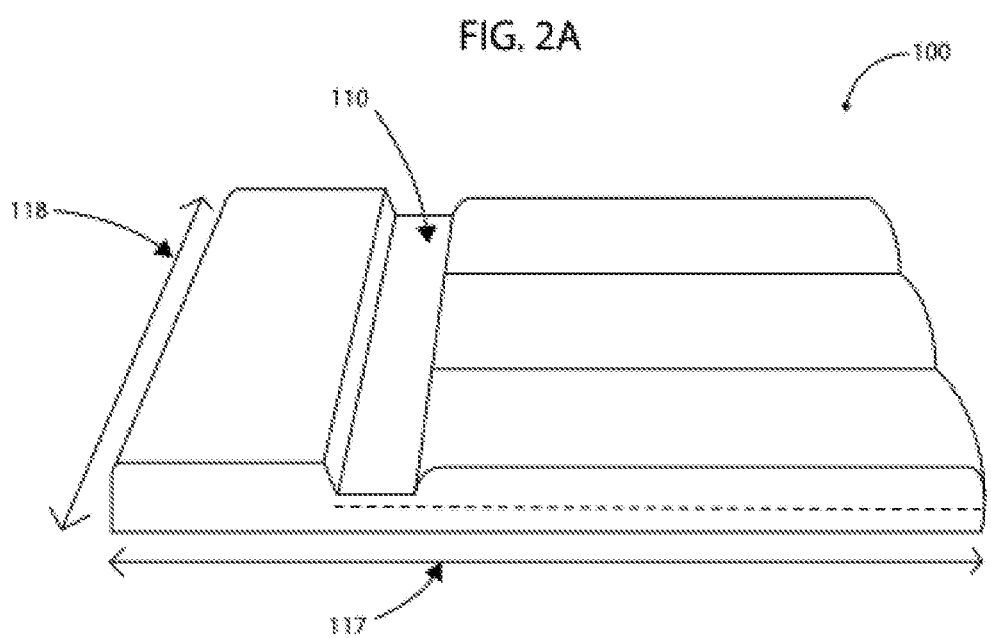
FIG. 2B is a side perspective view of the pet bed of FIG. 1, according to an embodiment of the present disclosure.

FIGS. 2A-2B show side perspective views of the pet bed 100 of FIG. 1, according to an embodiment of the present disclosure. The cushioned-base 110 may be defined by a body-section 112 and a head-section 114. The body-section 112 may include a first molded-section 116 and the head-section 114 may include a second molded-section 118. Preferably, the second molded-section 118 may define a pillow 119. Further, the body-section 112 may include a third molded-section 111 and a fourth molded-section 113. As shown, the first molded-section 116, the third molded-section 111 and the fourth molded-section 113 may be parallel to each other and act as cushioned contours to aid in comfort of a pet 5 using the pet bed 100.

In a preferred embodiment, the cushioned-base 110 may be constructed from a foam material. The foam material may be firm but soft to allow for proper support of the pet 5 whilst providing comfort. In one embodiment, the foam material may include polyurethane. In one embodiment, the foam material may be memory foam to provide an elasticity to the cushioned-base 110.

Further, in the preferred embodiment, cushioned-base 110 may include a rectangular-shape, similar to a conventional 'human' bed. In this embodiment, the cushioned-base 110 may include a width 115 of between 25-30 inches and a length 117 of between 40-45 inches. Preferably, the width 115 of the cushioned-base 110 may be 28 inches, and the length 117 of the cushioned-base 110 may be 42 inches, however, it should be appreciated that the specifications may vary and the measurements given are not meant to be limiting. In addition, in other embodiments, the cushioned-base 110 may include shapes other than the rectangular-shape. For example, the cushioned-base 110 may be square-shape, circular-shape, triangle-shape, etc.

Figure 3:
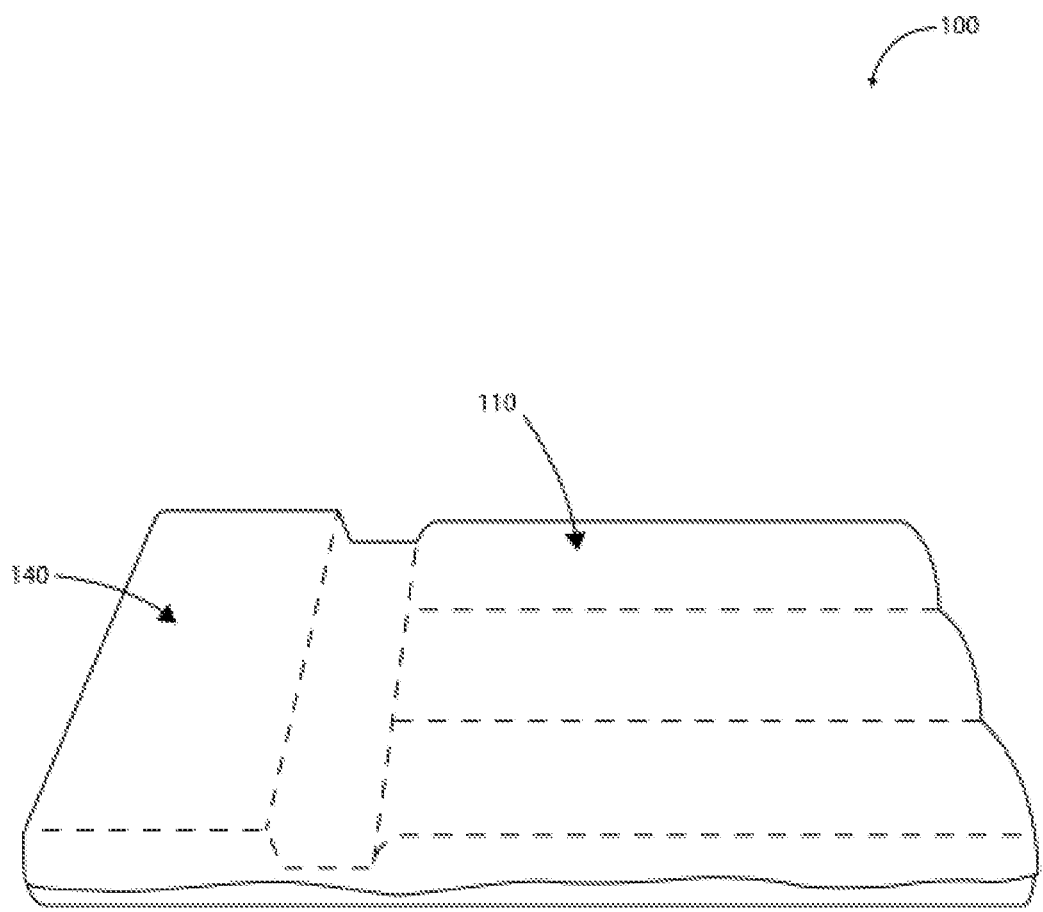
FIG. 3 is a side perspective view of the pet bed of FIG. 1, according to an embodiment of the present disclosure.

Referring now to FIG. 3 showing a side perspective view of the pet bed 100 of FIG. 1, according to an embodiment of the present disclosure. As shown, the pet bed 100 may further comprise a cover 140 configured to cover 140 the cushioned-base 110 and act as a protector the cushioned-base 110 and also provide added softness and comfort to the pet 5 (FIG. 1). The cover 140 may preferably be constructed from a fabric able to be washed so that the cover 140 may be removed from the cushioned-base 110 and washed to remove debris, pet hair, etc., rather than having to wash the cushioned-base 110 itself. In one embodiment, the fabric may be cotton. However, other materials are contemplated.

Figure 4A:
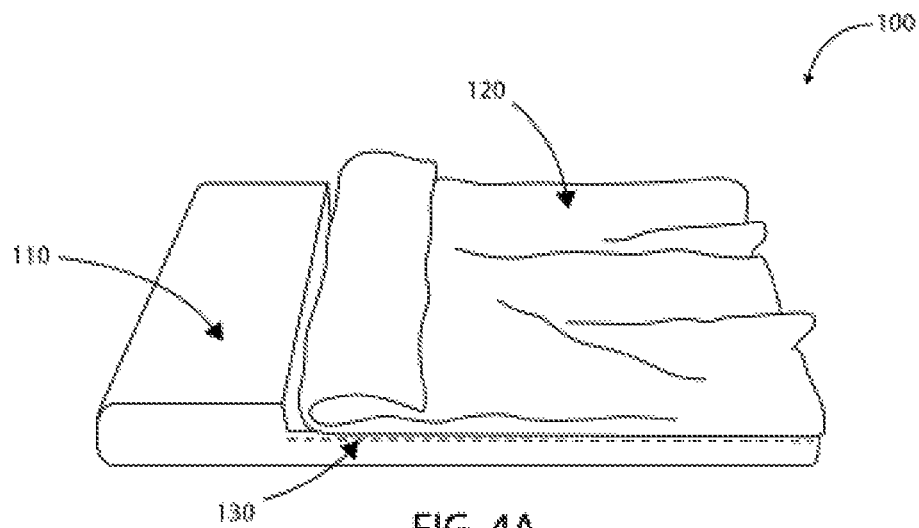
FIG. 4A is a side-top perspective view of the pet bed of FIG. 1, according to an embodiment of the present disclosure.
Figure 4B:
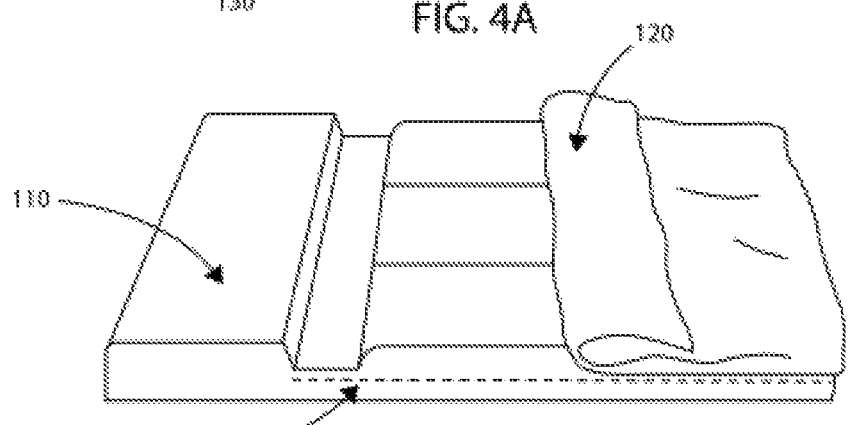
FIG. 4B is a side-top perspective view of the pet bed of FIG. 1, according to an embodiment of the present disclosure.
Figure 4C:
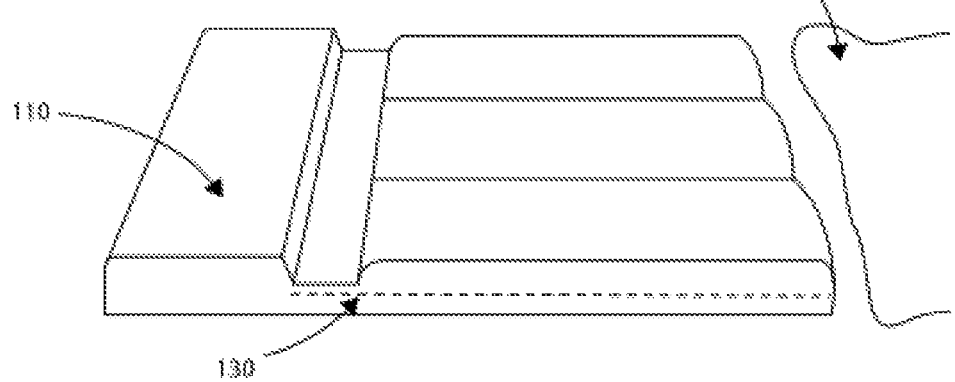
FIG. 4C is a side-top perspective view of the pet bed of FIG. 1, according to an embodiment of the present disclosure.

FIGS. 4A-4C show side-top perspective views of the pet bed 100 of FIG. 1, according to an embodiment of the present disclosure. As shown, the blanket 120 may be removably fastened to the cushioned-base 110. Preferably, the blanket 120 may be made from a washable fabric 122 such that the blanket 120 is able to be removed and washed, similar to the cover 140 as discussed above. In the preferred embodiment, the washable fabric 122 may be a plush material to provide softness, warmth comfort to the pet. The plush material may comprise polyester. In another embodiment, the washable fabric 122 may be a fleece material or a wool material. Other materials are contemplated.

The fastener 130 may be provided for removably fastening the blanket 120 to the cushioned-base 110. The fastener 130 may be able to selectively fully fasten the blanket 120 to the cushioned-base 110, partially fasten the blanket 120 to the cushioned-base 110, and fully unfasten the blanket 120 from the cushioned-base 110 such that the blanket 120 is able to fold and provide differing levels of coverage for the pet 5. Preferably, the fastener 130 may be a zipping-fastener 130. However, other fasteners 130 may be contemplated such as hook and loop fastener, snap fasteners, buttons, hook and eye fastener, etc.

Figure 5:
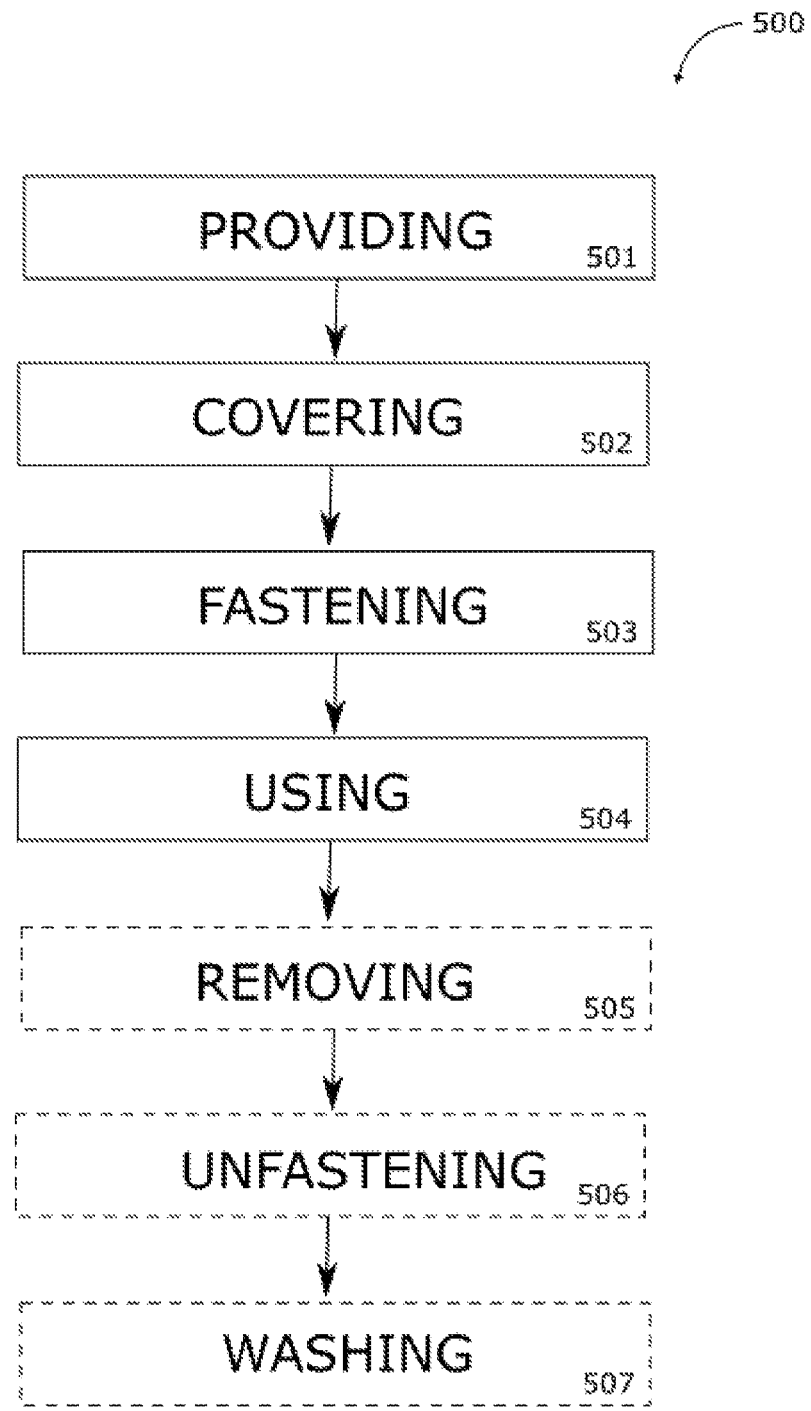
FIG. 5 is a flow diagram illustrating a method of use for pet bed, according to an embodiment of the present disclosure.

Referring now to FIG. 5, a flow diagram illustrating a method of using a pet bed 500, according to an embodiment of the present disclosure. As illustrated, the method of using a pet bed 500 may include the steps of: providing 501 the pet bed 100 as above; covering 502 the cushioned-base 110 with a cover 140; fastening 503 the blanket 120 to the cushioned-base 110 via the fastener 130; and using 504 the pet bed 100. Further steps may include: removing 505 the cover 140 from the cushioned-base 110; unfastening 506 the blanket 120 from the cushioned-base 110 via the fastener 130; and washing 507 the cover 140 and the blanket 120.

It should be noted that step 505, 506 and 507 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for pet bed 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet bed comprising:
   a cushioned-base defined by
     a body-section comprising at least three convex ridges, each of the at least three convex ridges being parallel to each other,
     a head-section comprising a pillow, and
     a channel delineating the body-section from the head-section;
   a blanket removably fastened to the cushioned-base, the blanket being constructed from a washable fabric; and
   a fastener for removably fastening the blanket to the cushioned-base, the fastener being able to selectively fully fasten the blanket to the cushioned-base, partially fasten the blanket to the cushioned-base, and fully unfasten the blanket from the cushioned-base.

2. The pet bed of claim 1, wherein each of the at least three convex ridges are perpendicular to the channel.

3. The pet bed of claim 1, wherein the fastener is a zipping-fastener.

4. The pet bed of claim 1, further comprising a cover configured to cover the cushioned-base.

5. The pet bed of claim 4, wherein the cover is constructed from a fabric able to be washed.

6. The pet bed of claim 5, wherein the fabric is cotton.

7. The pet bed of claim 1, wherein the cushioned-base includes a rectangular-shape.

8. The pet bed of claim 7, wherein the cushioned-base includes a width of between 25-30 inches.

9. The pet bed of claim 7, wherein the cushioned-base includes a length of between 40-45 inches.

10. The pet bed of claim 1, wherein the cushioned-base includes a square-shape.

11. The pet bed of claim 1, wherein the cushioned-base includes a circular-shape.

12. The pet bed of claim 1, wherein the cushioned-base is constructed from a foam material.

13. The pet bed of claim 12, wherein the foam material comprises polyurethane.

14. The pet bed of claim 1, wherein the washable fabric is a plush material.

15. The pet bed of claim 14, wherein the plush material comprises polyester.

16. The pet bed of claim 1, wherein the washable fabric is a fleece material.

17. The pet bed of claim 1, wherein the washable fabric is a wool material.

18. A pet bed comprising:
   a cushioned-base being made from a foam material, the cushioned-base including a rectangular-shape, the cushioned-base further being defined by
     a body-section comprising at least three convex ridges, each of the at least three convex ridges being parallel to each other,
     a head-section comprising a pillow, and
     a channel delineating the body-section from the head-section;
   a cover configured to cover the cushioned-base, the cover constructed from a fabric able to be washed;
   a blanket removably fastened to the cushioned-base, the blanket being constructed from a plush material; and
   a zipping-fastener for removably fastening the blanket to the cushioned-base, the zipping-fastener being able to selectively fully fasten the blanket to the cushioned-base, partially fasten the blanket to the cushioned-base, and fully unfasten the blanket from the cushioned-base;
   wherein each of the at least three convex ridges are perpendicular to the channel.
   wherein the cushioned-base includes a width of between 25-30 inches; and
   wherein the cushioned-base includes a length of between 40-45 inches.

* * * * *